United States Patent [19]

Morimura et al.

[11] Patent Number: 5,172,226
[45] Date of Patent: Dec. 15, 1992

[54] MOTION VECTOR DETECTING APPARATUS AND IMAGE STABILIZER INCLUDING THE SAME

[75] Inventors: Atsushi Morimura, Nara; Kenya Uomori, Katano, both of Japan

[73] Assignee: Matsushita Electric Industrial Co., Ltd., Osaka, Japan

[21] Appl. No.: 700,464

[22] Filed: May 15, 1991

[30] Foreign Application Priority Data

May 21, 1990 [JP] Japan .................................. 2-130673

[51] Int. Cl.⁵ ............................................. H04N 7/18
[52] U.S. Cl. ...................................... 358/105; 358/222
[58] Field of Search .............. 358/105, 222, 136, 166, 358/125, 167

[56] References Cited

U.S. PATENT DOCUMENTS

| | | | |
|---|---|---|---|
| 4,864,409 | 9/1989 | Platte et al. | 358/222 |
| 4,984,074 | 1/1991 | Uomori et al. | 358/136 X |
| 5,019,901 | 5/1991 | Uomori et al. | 358/136 X |
| 5,043,807 | 8/1991 | Rabii | 358/167 X |

FOREIGN PATENT DOCUMENTS 2-246687 10/1990 Japan .
WO85/04542 10/1985 PCT Int'l Appl. .
2187913 9/1987 United Kingdom .

*Primary Examiner*—Victor R. Kostak
*Attorney, Agent, or Firm*—Wenderoth, Lind & Ponack

[57] ABSTRACT

In a motion vector detecting apparatus and an image stabilizer including the motion vector detecting apparatus, the motion vector detecting apparatus includes a motion vector arithmetic unit for calculating a motion vector of an inputted image signal, an integrator for integrating the motion vector, a still decision unit for judging whether or not the inputted image signal represents a still image, a coring value determiner for determining a coring value on the basis of outputs from the integrator and the still decision unit and a coring circuit which controls the coring value on the basis of an output from the coring value determiner so as to perform coring processing on an output of the motion vector arithmetic unit.

7 Claims, 9 Drawing Sheets

MOTION VECTOR DETECTING APPARATUS AND IMAGE STABILIZER INCLUDING THE SAME

BACKGROUND OF THE INVENTION

The present invention relates to a motion vector detecting apparatus for detecting a motion vector of an inputted image, i.e. an amount of displacement of the inputted image and an image stabilizer for correcting sway of an outputted image, which includes the motion vector detecting apparatus.

A motion vector detecting apparatus employing a correlational arithmetic unit is known from, for example, Japanese Laid-Open Patent Publication No. 2-246687 filed by the assignee assigned by the present inventors. FIG. 1 to 4 show the known motion vector detecting apparatus in which the correlational arithmetic unit utilizes absolute values of differences. In FIGS. 1 and 3, the known motion vector detecting apparatus includes a motion vector detector 9 and a coring processor 13. The motion vector detector 9 includes a first latch 1, a representative point memory 2, a second latch 3, a subtracter 4, an address controller 5, an absolute value converter 6, an accumulative adder 7 and a decision unit 8 for judging an address of a minimum value. Meanwhile, the coring processor 13 includes a coring circuit 10, an integrator 11 and a coring value determiner 12. The subtracter 4 may be replaced by an adder if a complement is employed.

The known motion vector detecting apparatus of the above described arrangement is further described hereinbelow. Initially, a motion vector of an image is described with reference to FIGS. 5a to 5c. FIG. 5a shows an image at a time point and FIG. 5b shows an image subsequent to the image of FIG. 5a by one field or one frame. When the image is displaced in parallel by movement of an image pickup device, etc. as shown in FIGS. 5a and 5b, an amount of parallel displacement of the image is expressed by a vector of the arrow in FIG. 5c and this vector is referred to as a "motion vector".

FIG. 2 shows a representative point and pixels surrounding the representative point in a so-called representative point matching method which is most popular among motion vector detecting methods. In this method, image data is disposed at a representative point in a field and a motion vector is detected by performing a correlational arithmetic operation for determining to which one of the surrounding pixels the image data is displaced in the next field.

Then, operation of the known motion vector detecting apparatus employing the correlational arithmetic unit is described with reference to FIGS. 1 and 2. Image data at respective representative points on a screen are received by the first latch 1 in response to a timing pulse LP1 and are, at a certain timing, written at addresses of the representative point memory 2, which correspond to the representative points, respectively. Subsequently, in the next field or the next frame, a difference between image data in a motion vector detecting area surrounding each representative point and image data of each representative point of the previous field stored in the representative point memory 2 is obtained. An absolute value of the difference is obtained by the absolute value converter 6 and is inputted to the accumulative adder 7. Data representing the absolute values of the differences each obtained on the basis of coordinates of each representative point, namely outputs of the absolute value converter 6 are accumulatively added. When accumulative addition of the data for all the representative points has been completed, the location of a minimum value of the accumulative sums stored by the accumulative adder 7 is judged by the decision unit 8. In a correlational decision based on the absolute values of the differences, the absolute values of the differences become smaller at locations having a closer correlation. Hence, the location (address) of the minimum accumulative sum relative to the location (address) of the corresponding representative point indicates the motion vector.

Since the above described operation is performed for each field (frame), the first latch 1 is provided for storing, while a correlational arithmetic operation is being performed, image data at the representative points for correlational arithmetic operation in the next field (frame). Meanwhile, when a correlation between image data at a representative point and image data surrounding the representative point is obtained, the second latch 3 stores the image data at the representative point.

The coring processor 13 is described below. FIG. 4 shows input/output characteristics of the coring processor 13. Processing in which a minute component of an input
signal, i.e. a component corresponding to a portion $\alpha$ of FIG. 4 is outputted as 0 is referred to as "coring processing". Since levels of noise components in a signal are generally low, coring processing is used for eliminating minute noise components. However, effective signal components may exist in minute variable components. Therefore, if the coring amount of FIG. 4 is set too large, the change of the signal components will appear conspicuously. Meanwhile, since fluctuations of the detected motion vector also pose a problem, it is necessary to eliminate the fluctuations. Especially when the sway of the image of the input signal is small, the fluctuations become conspicuous. Thus, a condition that sway of the image of the input signal is small is detected by integrating an x-axis component vect x and a y-axis component vect y of the motion vector by the integrator 11 and coring characteristics of the coring circuit 10 are controlled by the coring value determiner 12. FIG. 6 show attenuation characteristics of a coring value in the motion vector detector 9.

As the integrated motion vector is increased, the coring value is reduced. Thus, in a region where fluctuations of the detected motion vector due to noise components are conspicuous, namely when the integrated motion vector is small, the coring amount is increased so as to lessen the influence of the fluctuations. On the contrary, in a region where the fluctuations of the detected motion vector due to noise components are not so conspicuous, namely the integrated motion vector is large, the coring amount is reduced such that an error in the detected motion vector is lessened. As a result, elimination of the signal components due to coring processing is minimized.

However, in the known motion vector detecting apparatus of the above described arrangement, in the case where an image signal of an image having a close correlation in one direction is inputted, the integrated motion vector may assume a large value even when the image is a still image, so that coring processing does not function properly and thus, such a problem arises that fluctuations of the motion vector become conspicuous in a state of input of the image signal of the image having a close correlation in one direction.

SUMMARY OF THE INVENTION

Accordingly, an essential object of the present invention is to provide, with a view to eliminating the drawbacks of the conventional motion vector detecting apparatuses, a motion vector detecting apparatus which detects a state of input of a still image so as to control a coring value such that fluctuations of a motion vector do not become conspicuous and which controls, in the case of input of an image other than a still image, the coring value such that the coring value does not assume a small value.

In order to accomplish this object of the present invention, a motion vector detecting apparatus for detecting a motion vector of an inputted image signal, in one aspect of the present invention comprises: a motion arithmetic unit for calculating the motion vector of the inputted image signal; an integrator for integrating the motion vector; a still decision unit for judging whether or not the inputted image signal represents a still image; a coring value determiner for determining a coring value on the basis of outputs from said integrator and said still decision unit; and a coring circuit which controls the coring value on the basis of an output from said coring value determiner so as to perform coring processing on an output of said motion vector arithmetic unit.

Furthermore, in another aspect of the present invention, there is provided an image stabilizer for correcting sway of an outputted image, which includes the motion vector detecting apparatus.

By the above described arrangement of the present invention, the detected motion vector is subjected to coring in accordance with magnitude of the detected motion vector and result of decision on the still image. Therefore, in accordance with the present invention, detection accuracy at the time of detection of a large motion vector is not lowered and fluctuations of the motion vector can be suppressed even when the correlation in the image is close in one direction.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
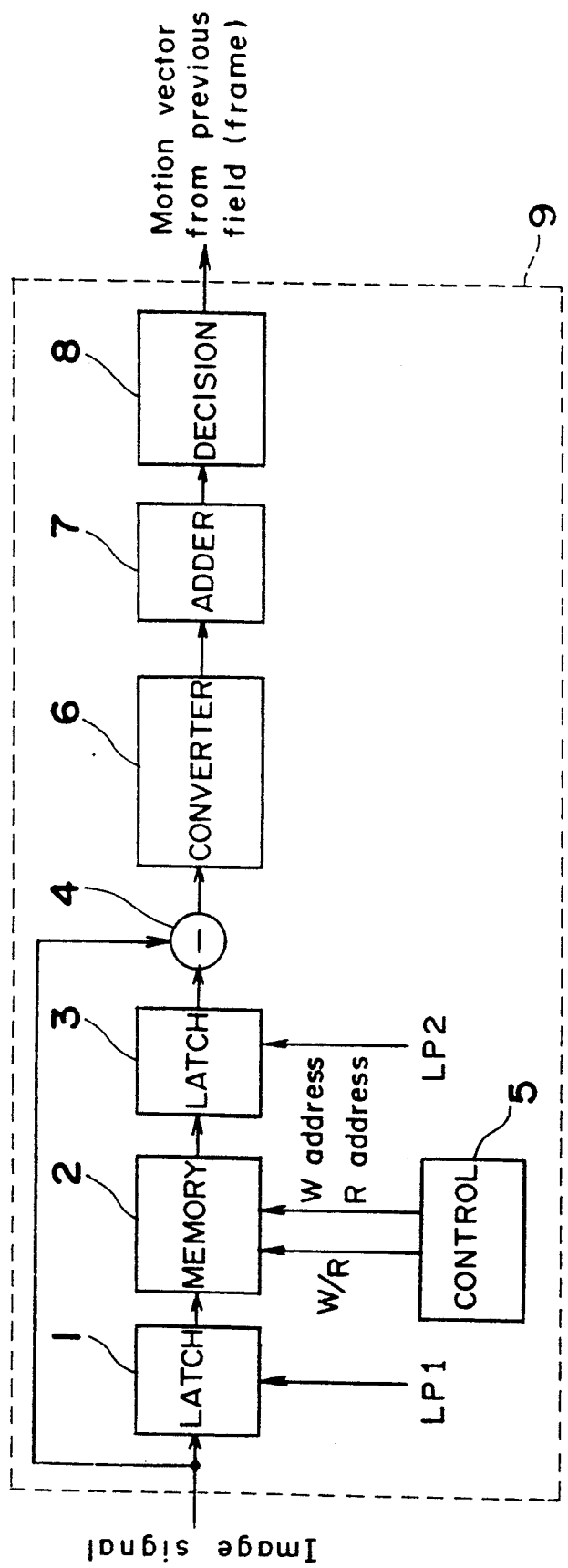
FIG. 1 is a block diagram of a motion vector detector employed in a prior art motion vector detecting apparatus (already referred to)
Figure 2:
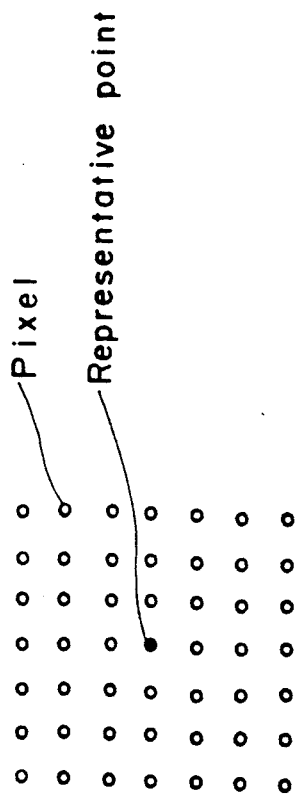
FIG. 2 is a view explanatory of a representative point and pixels surrounding the representative point (already referred to)
Figure 3:
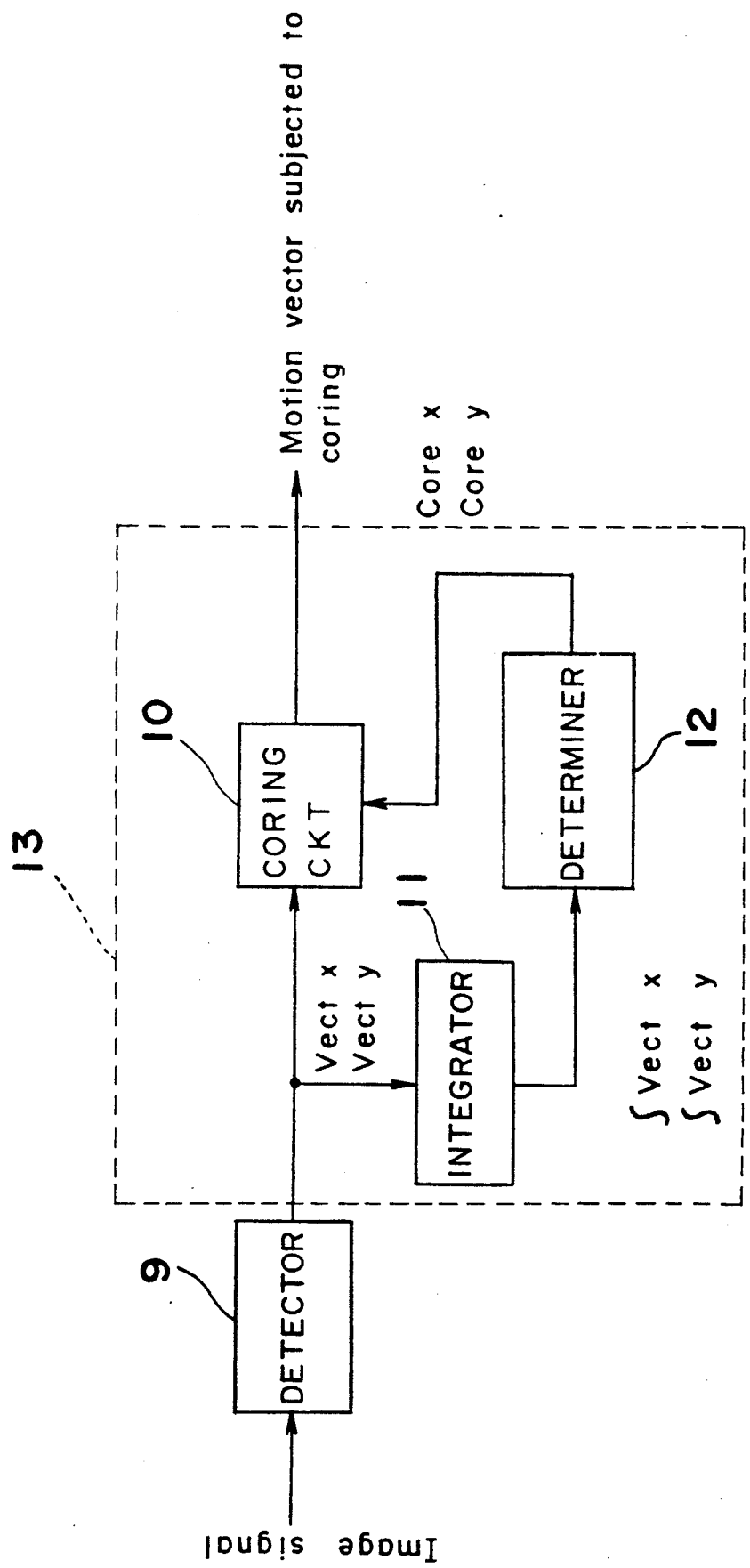
FIG. 3 is block diagram of a coring processor employed in the prior art motion vector detecting apparatus of FIG. 1 (already referred to)
Figure 4:
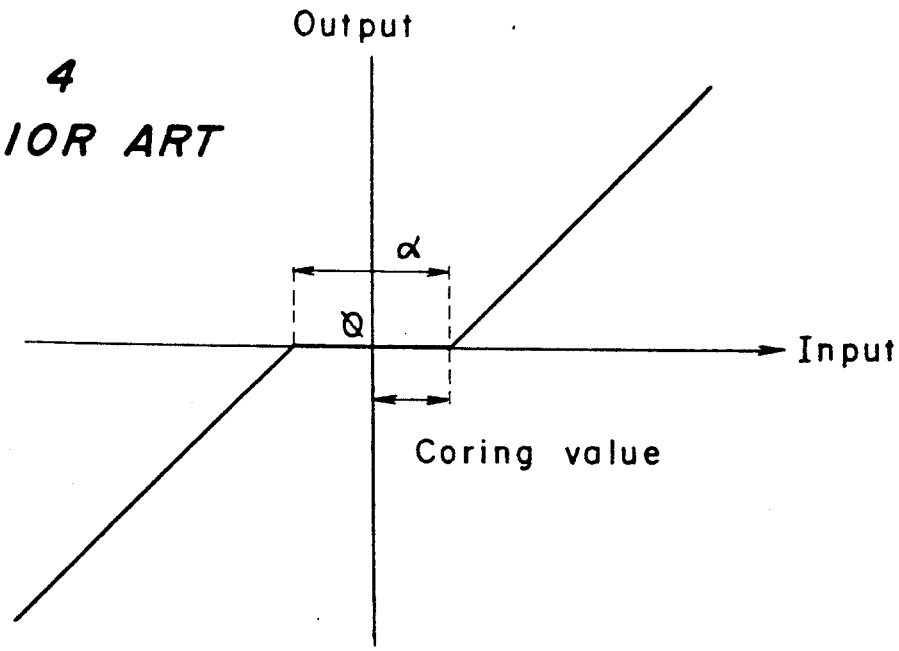
FIG. 4 is a graph showing input/output characteristics of a coring circuit of the coring processor of FIG. 3 (already referred to)
Figure 5A:
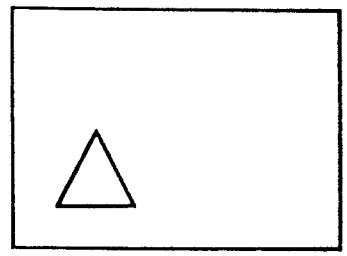
FIGS. 5a to 5c are views explanatory of a motion vector of an image (already referred to)
Figure 5B:
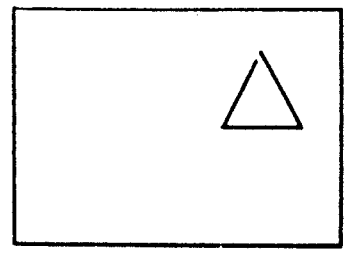
Figure 5C:
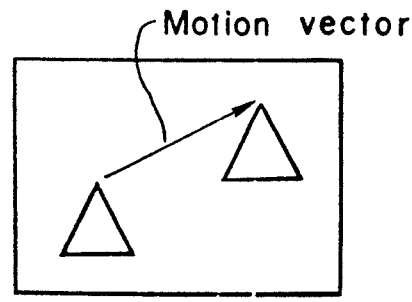
Figure 6:
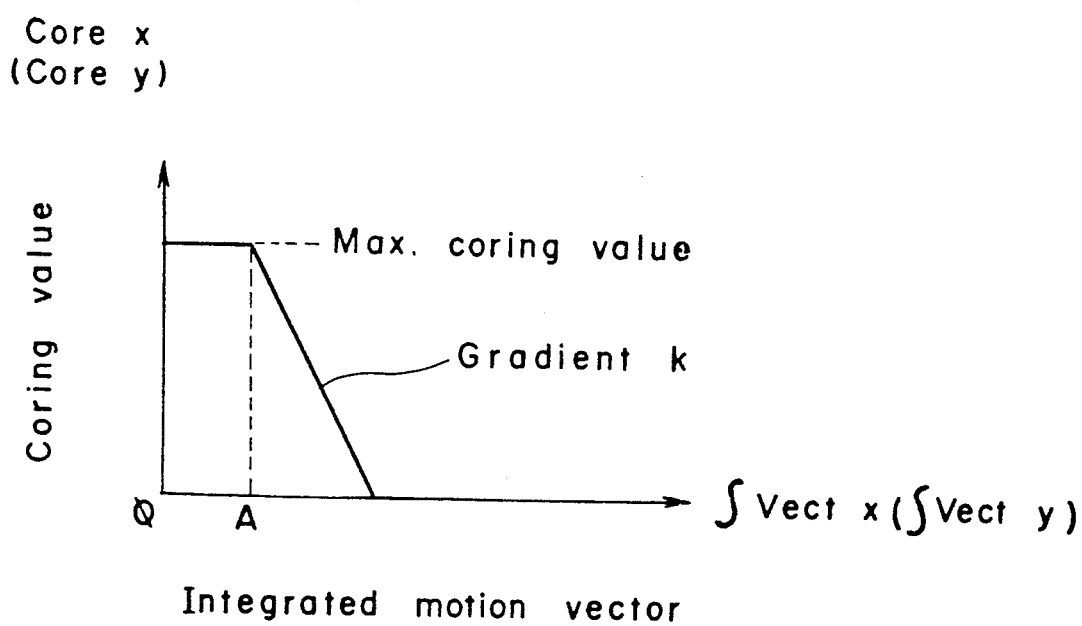
FIG. 6 is a graph showing attenuation characteristics of a coring value in the motion vector detector of FIG. 1 (already referred to)
Figure 7:
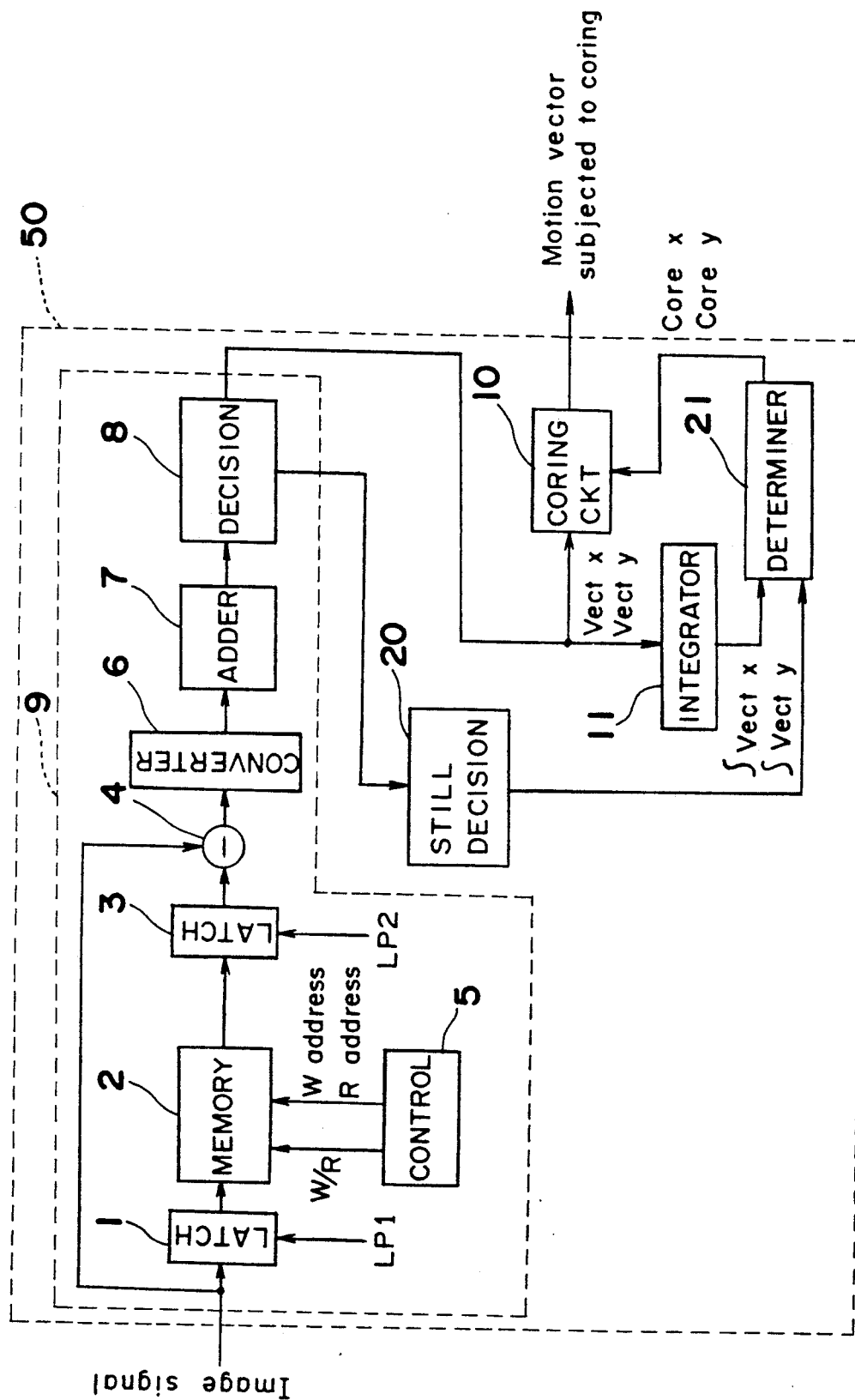
FIG. 7 is a block diagram of a motion vector detecting apparatus according to a first embodiment of the present invention.

Referring now to the drawings, there is shown in FIG. 7, a motion vector detecting apparatus 50 according to a first embodiment of the present invention. The motion vector detecting apparatus 50 is characterized by a still decision unit 20 and a coring value determiner 21. In the same manner as a prior art motion vector detecting apparatus of FIGS. 1 and 3, the motion vector detecting apparatus 50 includes a motion vector detector 9, a coring circuit 10 and an integrator 11. The motion vector detector 9 includes a first latch 1, a representative point memory 2, a second latch 3, a subtracter 4, an address controller 5, an absolute value converter 6, an accumulative adder 7 and a decision unit 8 for judging an address of a minimum value.

Figure 8:
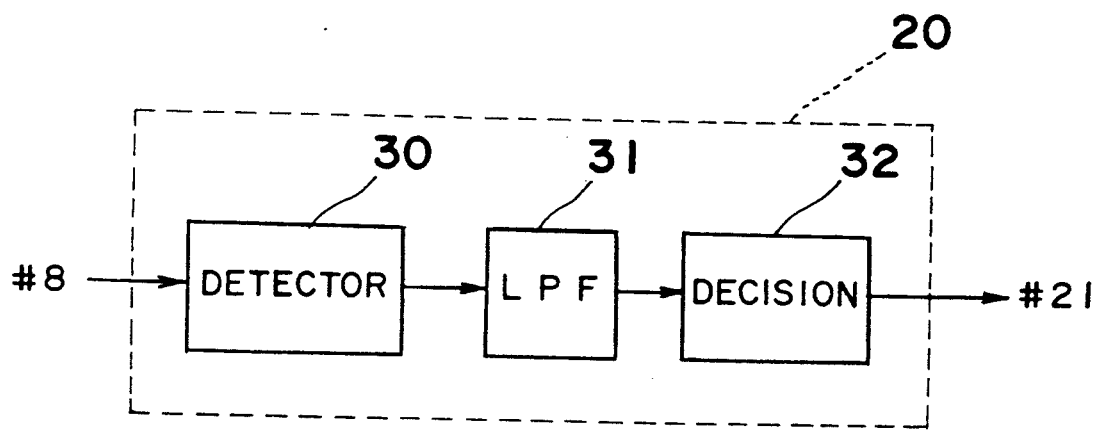
FIG. 8 is a block diagram of a still decision unit employed in the motion vector detecting apparatus of FIG. 7.

As shown in FIG. 8, the still decision unit 20 includes a difference detector 30, a low-pass filter 31 and a decision unit 32. For each field (frame), a minimum value obtained by the decision unit 8 is inputted to the difference detector 30 in which an absolute value of a difference between the inputted minimum value and a minimum value of a frame preceding the frame of the inputted minimum value by one frame is obtained. The low-pass filter 31 for eliminating a high frequency band eliminates rapid changes from an output of the difference detector 30. If an inputted image signal represents a still image, variations of the minimum value are small, so that the value obtained at the low-pass filter 31 becomes small. On the other hand, if an image is swaying, variations of the minimum value are large, so that the value obtained at the low-pass filter 31 becomes large.

Figure 9:
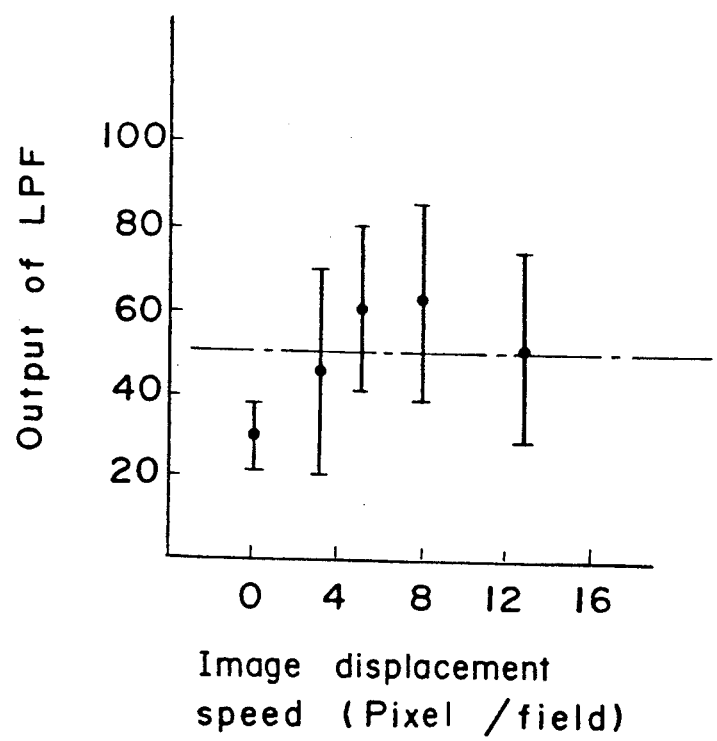
FIG. 9 is a graph showing relationship between the speed of displacement of image through movement of a camera and the level of signal of the still decision unit of FIG. 8.
Figure 10:
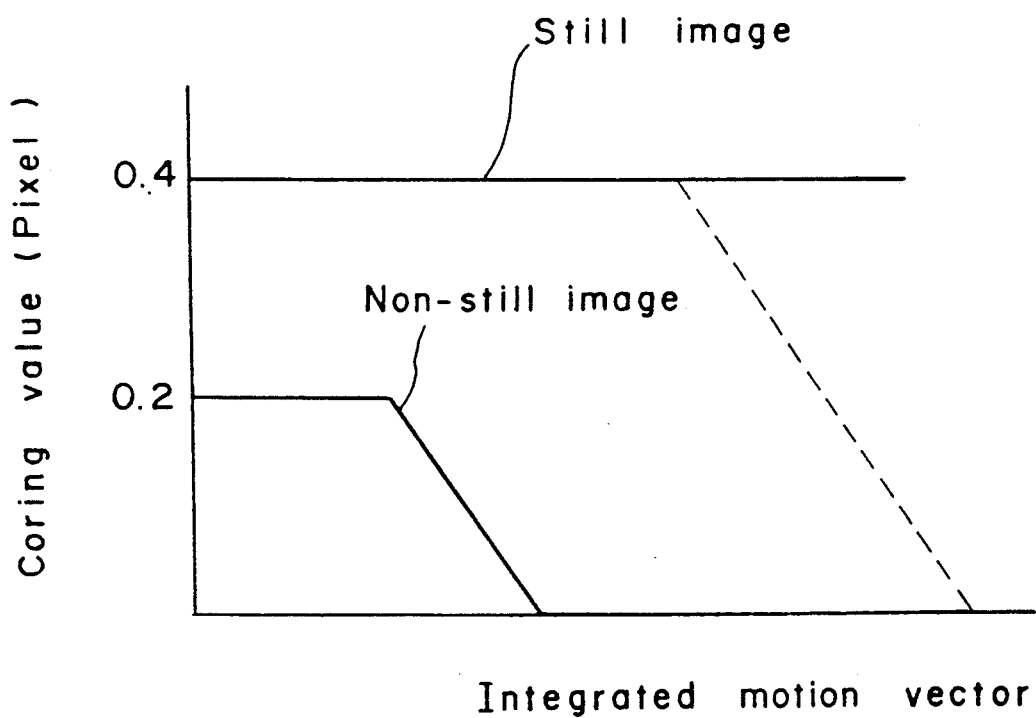
FIG. 10 is a graph showing the attenuation characteristics of a coring value in the motion vector detecting apparatus of FIG. 7.

FIG. 9 shows relationship between the speed of displacement of the image (corresponding to speed of movement of a camera) and the output value of the low-pass filter 31. The abscissa is expressed by the number of pixels per field, while the ordinate is expressed by standard deviation of the output value of the low-pass filter 31. In FIG. 9, if output of the low-pass filter 31 is 50 or less, it is possible to judge that the inputted image is still. When a still state, i.e. a state of output of 50 or less from the low-pass filter 31 has been detected continuously, the decision unit 32 judges that the inputted image is still and transmits a still signal indicative of the still image to the coring valve determiner 21. In response to the still signal, the coring value determiner 21 increases a coring value irrespective of an integrated motion vector as shown in FIG. 10. Thus, the coring value is increased irrespective of the integrated motion vector only when the still condition has been established as described above. Therefore, even if correlation in the image becomes close in one direction and thus, the integrated motion vector becomes slightly large, the motion vector can be outputted by compressing fluctuations of the motion vector.

Thus, by controlling the coring value by the coring value determiner 21 in this embodiment, elimination of noise from the signal is mainly performed in a region where fluctuations of the detected motion vector due to noise components are conspicuous, namely, when the integrated motion vector is small. On the other hand, in a region where fluctuations of the detected motion vector due to noise components are not so conspicuous, namely, when the integrated motion vector is large, elimination of the signal components due to coring processing is minimized such that errors in the detected motion vector are lessened. As a result, when a large motion vector has been detected, detection accuracy is not lowered. Meanwhile, when a small motion vector has been detected, minute noise components of the detected motion vector are suppressed.

Furthermore, the coring value is increased irrespective of the integrated motion vector been established. Therefore, even if correlation in the image becomes close in one direction and thus, the integrated motion vector becomes slightly large, the motion vector can be detected by compressing fluctuations of the motion vector.

Figure 11:
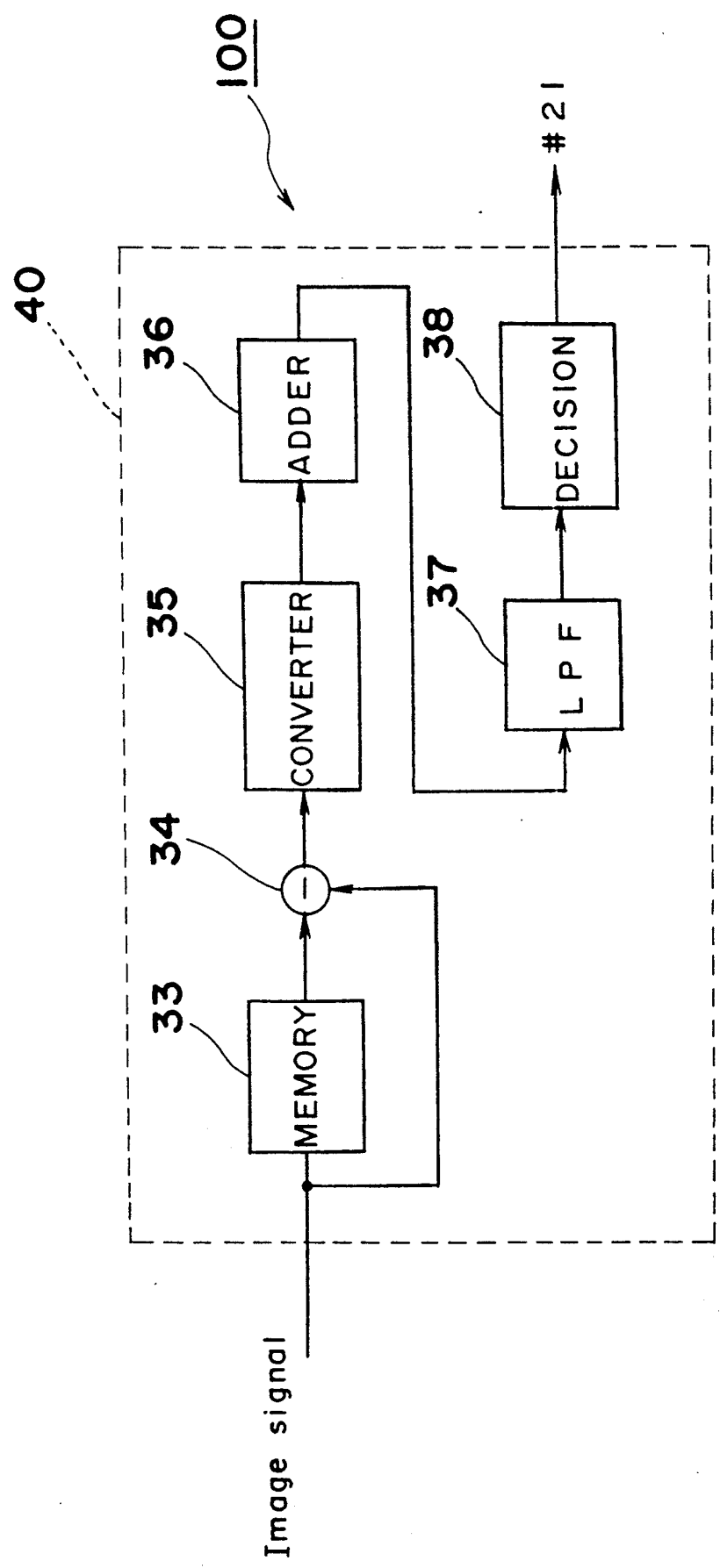
FIG. 11 is a block diagram of a still decision unit employed in a motion vector detecting apparatus according to a second embodiment of the present invention.

FIG. 11 shows a still decision unit 40 employed in a motion vector detecting apparatus 100 according to a second embodiment of the present invention. Since other construction features of the motion vector detecting apparatus 100 are the same as the motion vector detecting apparatus 50, the description thereof has been abbreviated for the sake of brevity. In FIG. 11, the still decision unit 40 includes a memory 33 for storing a part or a whole of an image signal, a subtracter 34, an absolute value converter 35, an accumulative adder 36, a low-pass filter 37 and a decision unit 38.

Operation of the still decision unit 40 of the above described arrangement is described hereinbelow. An image signal inputted to the still decision unit 40 is stored in the memory 33 temporarily and a difference between the image signals of two successive fields or frames is calculated by the subtracter 34. This calculation of the difference is not required to be performed for whole pixels of the inputted image signals but for a small portion, e.g. $\frac{1}{3}$ to 1/5 of the whole pixels or a minute portion, e.g. 1/30 to 1/50 of the whole pixels which is restricted to a low-frequency band. Absolute values of the thus obtained differences of the image signals are obtained by the absolute value converter 35 and are accumulatively added by the accumulative adder 36. Thus, a sum of the differences between the successive fields (frames) are obtained. In the case of a still image, the obtained sum is formed by noise components only and therefore assumes a small value. On the other hand, in the case where an image has changed greatly or a camera has been panned or tilted, the sum assumes a large value. A rapid change portion in the input signal is attenuated by the low-pass filter 37. Then, based on whether an output of the low-pass filter 37 is large or small, the decision portion 38 makes a decision as to whether or not the image signal represents a still image.

After a decision as to whether or not the image signal represents a still image has been made as described above, a result of the decision is transmitted to the coring value determiner 21 in the same manner as the motion vector detecting apparatus 50. When the still condition has been same manner as in the first embodiment and the motion vector is outputted by compressing the fluctuation components of the motion vector.

In this embodiment, the difference of the image signals is directly calculated as described above. Thus, even if the camera is panned or tilted slightly, it becomes possible to accurately judge whether or not the image signal represents a still image. Therefore, the motion vector can be detected stably without adversely affecting calculation of the motion vector.

Figure 12:
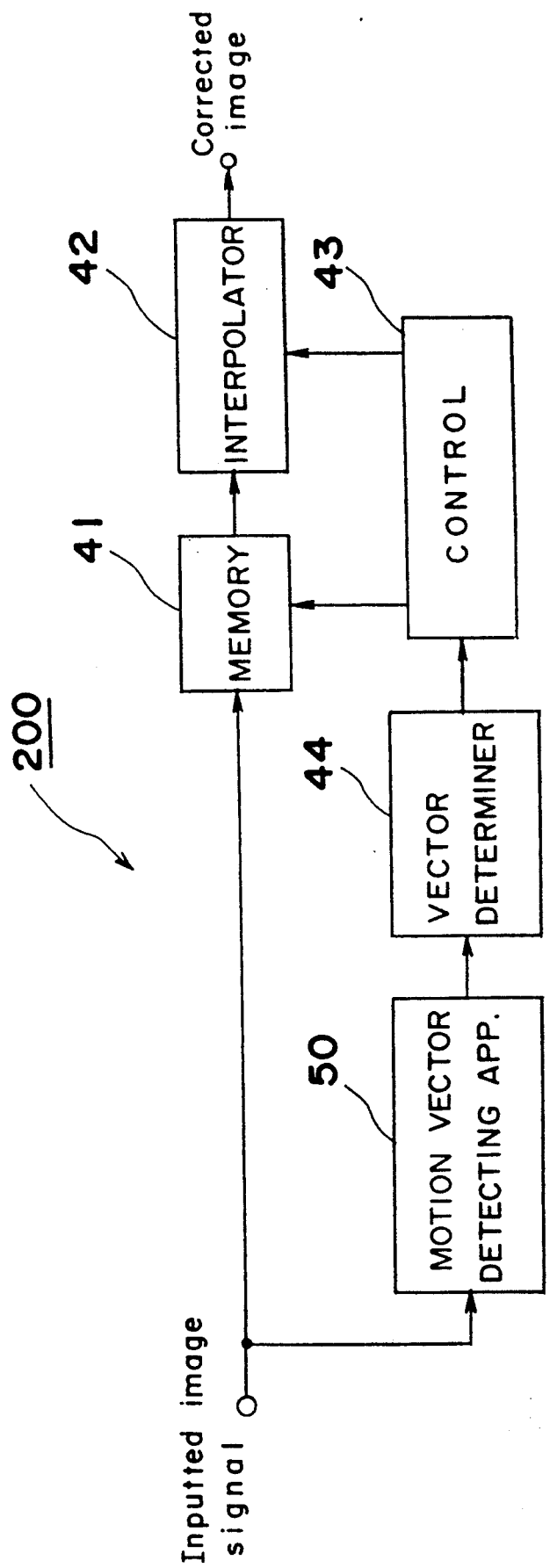
FIG. 12 is a block diagram of an image stabilizer including the motion vector detecting apparatus of FIG. 7, in another aspect of the present invention.

An image stabilizer 200 in another aspect of the present invention is described with reference to FIG. 12. The image stabilizer 200 includes the motion vector detecting apparatus 50 of FIG. 7, a memory 41, an interpolator 42 for interpolating an image disposed at an arbitrary position, a vector determiner 44 for determining a motion vector of an image from among prospective motion vectors and an output controller 43 for controlling the memory 41 and the interpolator 42 on the basis of the motion vector of the image. The memory 41 is provided for storing image signals and reading out the image signals disposed at arbitrary positions of pixels.

The operation of the image stabilizer 200 of the above described below arrangement is described. In FIG. 12, since the motion vector is obtained in the same fashion as that of the first embodiment, a description thereof has been abbreviated for the sake of brevity. Prospective motion vectors of an image signal inputted from the motion vector detecting apparatus 50 are, respectively, obtained from four regions divided vertically and horizontally and a motion vector of the inputted image signal is determined in the vector determiner 44 by a median filter for selecting a median value. Then, the determined motion vector of the image signal is inputted to the output controller 43. In the case where the motion vector is expressed by an address of the memory 41 in which the image signal is stored, the address for signal read-out of the memory 41 is determined by the output controller 43 in accordance with an integral portion of the motion vector. Meanwhile, the output controller 43 controls the interpolator 42 in accordance with a decimal portion of the motion vector. The interpolator 42 performs linear interpolation in which multiplication of a weight corresponding to an inverse number of a distance is performed in both vertical and horizontal directions. Thus, the output controller 43 shifts the image in a direction opposite to that of sway of the image so as to cancel sway of the image. Meanwhile, the output controller 43 magnifies an original image to an output image about 1.1 to 1.5 times as large as the original image and shifts the image in the memory 41 vertically and when the image is outputted.

In prior art image stabilizers, when correlation in the image is close in one direction, fluctuations of the motion vector are large and an outputted image sways despite of input of a still image. However, in the above described arrangement of the image stabilizer 200 by employing the motion vector detecting apparatus of the present invention, even when correlation in the image is close in one direction, fluctuations of the motion vector are compressed to a low level and sway of the outputted image is reduced such that correction of sway of the outputted image is performed stably.

Meanwhile, it should be noted that FIG. 10 shows one example of characteristics of the coring value. Thus, the coring value may assume arbitrary characteristics such as that shown by a dotted line in FIG. 10.

Furthermore, a method of judging whether or not an image signal represents a still image is not restricted to those of the above embodiments and may also employ, for example, an acceleration sensor, etc.

Moreover, in the image stabilizer of the present invention, the image is magnified and shifted by using the memory such that sway of the outputted image is corrected. However, this method may also be replaced by a method in which read-out of an image pickup element such as a charge coupled device is controlled in place of the memory.

As is clear from the foregoing description, in the motion vector detecting apparatus of the present invention, even when correlation in the image is close in one direction so as to increase fluctuations of the motion vector, the detected motion vector is subjected to coring processing of proper magnitude in accordance with magnitude of the detected motion vector or still conditions of the image. Thus, in accordance with the present invention, fluctuations of the motion vector, which are minute noise components causing detection error, are restricted to a minimum and reduction of a large motion vector can be minimized such that detection error is lessened.

Meanwhile, in the image stabilizer of the present invention, even in the case where fluctuation of the motion vector are large due to poor detection conditions of the motion vector and thus, the outputted image sways despite of input of a still image, fluctuations of the motion vector are compressed to a low level and sway of the outputted image is reduced such that correction of sway of the outputted image is performed stably.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A motion vector detecting apparatus for detecting a motion vector of an inputted image signal, comprising:
   a motion vector arithmetic unit for calculating the motion vector of the inputted image signal;
   an integrator for integrating the motion vector;
   a still decision unit for judging whether or not the inputted image signal represents a still image;
   a coring value determiner for determining a coring value on the basis of outputs from said integrator and said still decision unit; and
   a coring circuit which controls the coring value on the basis of an output from said coring value determiner so as to perform coring processing on an output of said motion vector arithmetic unit.

2. A motion vector detecting apparatus as claimed in claim 1, wherein by using a minimum value of said motion vector arithmetic unit, said still decision unit judges whether or not the inputted image signal represents the still image.

3. A motion vector detecting apparatus as claimed in claim 1, wherein by using the inputted image signal, said still decision unit judges whether or not the inputted image signal represents the still image.

4. An image stabilizer for correcting sway of an outputted image, comprising:
   a motion vector detecting apparatus for detecting a motion vector of an inputted image signal;
   said motion vector detecting apparatus including a motion vector arithmetic unit for calculating the motion vector of the inputted image signal, an integrator for integrating the motion vector, a still decision unit for judging whether or not the inputted image signal represents a still image, a coring value determiner for determining a coring value form outputs on the basis of said integrator and said still decision unit and a coring circuit which controls the coring value on the basis of an output from said coring value determiner so as to perform coring processing on an output of said motion vector arithmetic unit;
   a vector determiner for determining the motion vector of the inputted image signal in a whole screen; and
   an output controller which performs control in accordance with the motion vector determined by said vector determiner so as to either magnify and shift a portion of an inputted image or shift the portion of the inputted image such that the sway of the outputted image is reduced.

5. An image stabilizer as claimed in claim 4, wherein by using a minimum valve of said motion vector arithmetic unit, said still decision unit judges whether or not the inputted image signal represents the still image.

6. An image stabilizer as claimed in claim 4, wherein by using the inputted image signal, said still decision unit judges whether or not the inputted image signal represents the still image.

7. An image stabilizer as claimed in claim 4, further including a memory and an interpolator;
   wherein said memory writes the inputted image therein so as to temporarily store the inputted image and shifts the inputted image on pixel by one pixel in accordance with said output controller at the time of read-out from said memory;
   and wherein said interpolator performs an arithmetic operation of interpolation for shifting the inputted image through a distance less than one pixel and controls the outputted image so as to reduce the sway of the outputted image.

* * * * *